(12) United States Patent
Lamberton et al.

(10) Patent No.: US 7,128,986 B2
(45) Date of Patent: Oct. 31, 2006

(54) NANOCLUSTERED MAGNETIC MATERIALS FOR HIGH MOMENT WRITE POLE APPLICATIONS

(75) Inventors: Robert W. Lamberton, Limavady (GB); Declan Macken, Prior Lake, MN (US); Paul M. Dodd, Muff (IE); William J. O'Kane, Derry (GB)

(73) Assignee: Seagate Technology, LLC, Scotts Valley, CA (US)

( * ) Notice: Subject to any disclaimer, the term of this patent is extended or adjusted under 35 U.S.C. 154(b) by 63 days.

(21) Appl. No.: 10/686,841

(22) Filed: Oct. 16, 2003

(65) Prior Publication Data

US 2005/0084668 A1   Apr. 21, 2005

(51) Int. Cl.
G11B 5/127 (2006.01)
(52) U.S. Cl. .................. 428/812; 428/815; 428/692.1
(58) Field of Classification Search ...................... None
See application file for complete search history.

(56) References Cited

U.S. PATENT DOCUMENTS

| | | | | |
|---|---|---|---|---|
| 4,933,026 | A * | 6/1990 | Rawlings et al. ............ | 148/311 |
| 6,132,892 | A * | 10/2000 | Yoshikawa et al. ......... | 428/812 |
| 6,451,220 | B1 | 9/2002 | Ziolo et al. | |
| 6,802,753 | B1 * | 10/2004 | Ando et al. .................... | 445/6 |
| 2003/0021050 | A1* | 1/2003 | Lam ............................. | 360/46 |
| 2003/0129405 | A1* | 7/2003 | Zhang et al. ................ | 428/403 |
| 2003/0133224 | A1* | 7/2003 | Minor et al. ................ | 360/125 |
| 2003/0197982 | A1* | 10/2003 | Funayama et al. .......... | 360/321 |
| 2003/0209295 | A1* | 11/2003 | Cooper et al. .............. | 148/311 |
| 2004/0134565 | A1* | 7/2004 | Sun et al. .................... | 148/105 |
| 2005/0000444 | A1* | 1/2005 | Hass et al. ............ | 118/723 EB |

OTHER PUBLICATIONS

Kong et al. (Mag. Conf, 2002, INTERMAG Europe 2002, Digest Papers).*
Komuro et al. (J. Appl. Phys., 67(9), May 1990, 5126-5130).*
Pan et al. (IEEE Trans. Mag., 37(4) 2001, 2284-2287).*
Yu et al. (IEEE Trans. Mag., 38(5), 2002, 3030-3032).*
Katada et al. (IEEE Trans. Mag., 38(5), 2002, 2225-2227).*
S.H. Baker, C. Binns, K.W. Edmonds, M.J. Maher, S.C. Thornton, S. Louch, S.S. Dhesi, Enhancements in magnetic moments of exposed and Co-coated Fe nanoclusters as a function of cluster size, Jan. 17, 2002, pp. 19-25.
K.W. Edmonds, C. Binns, S.H. Baker, M.J. Maher, S.C. Thornton, O. Tjernberg, N.B. Brookes, Size dependence of the magnetic moments of exposed nanoscale iron particles; Oct. 3, 2000, pp. 113-119.
S.H. Baker, S.C. Thornton, K.W. Edmonds, M.J. Maher, C. Norris, and C. Binns, The construction of a gas aggregation source for the preparation of size-selected nanoscale transition metal clusters, Apr. 24, 2000, pp. 3178-3183.
A.M.N. Niklasson and B. Johansson, Interface magnetism of 3d transition metals, Jul. 22, 1998, pp. 6373-6382.

(Continued)

Primary Examiner—Kevin M. Bernatz
(74) Attorney, Agent, or Firm—Kinney & Lange, P.A.

(57) ABSTRACT

The present invention includes magnetic write elements with portions formed a nanophase high magnetic moment material to enable further increases in areal density in magnetic recording. The nanophase deposited high magnetic moment material comprises coated nanoclusters and nanolaminated cluster films that are deposited to form nanophase high magnetic moment material portions of a write pole and SUL layer in perpendicular recording media. The nanophase write poles exhibit high magnetic moments and are generally compatible with conventional writer head fabrication techniques.

22 Claims, 4 Drawing Sheets

OTHER PUBLICATIONS

S. Mirbt, O. Eriksson, and B. Johansson, Magnetic coupling in 3 $d$ transition-metal monolayers and bilayers on bcc (100) iron, Jul. 19, 1995, pp. 15070-15073.

Mark B. Knickelbein, Adsorbate-induced enhancement of the magnetic moments of iron clusters; Chemical Physics Letters; Feb. 19, 2002; pp. 221-225.

A Perez, P Melinon, V Dupuis, P Jensen, B Prevel, J Tuaillon, L Bardotti, C Martet, M Treilleux, M Broyer, M Pellarin, J L Vaille, B Palant, and J Lerme, Cluster assembled materials: a novel class of nanostructured solids with original structures and properties; J. Phys. D: Appl. Phys. 1997; pp. 709-721.

J T Lau, A Fohlisch, M Marins, R Nietubyc, M Reif and W Wurth; Spin and orbital magnetic moments of deposited small iron clusters studied by x-ray magnetic circular dichroism spectroscopy; New Journal of Physics; Published Dec. 12, 2002; pp. 98.1-98.12.

* cited by examiner

NANOCLUSTERED MAGNETIC MATERIALS FOR HIGH MOMENT WRITE POLE APPLICATIONS

CROSS-REFERENCE TO RELATED APPLICATION(S)

None.

BACKGROUND OF THE INVENTION

The present invention relates generally to the field of data storage and retrieval within magnetic media. In particular, the present invention relates to the use of nanoclustered magnetic materials in write pole applications where high magnetic moments are desired.

Continued growth of areal density in magnetic recording requires continuing reduction in the size of the data bits. However, as the size of an individual data bit shrinks, lower thermal stability is generally implied. The stability of a data bit is dependent on the anisotropy energy density ($K_u$) of the recording media, which is proportional to the product of the anisotropy field ($H_k$) and the saturation magnetization ($M_s$) of the media. To enable satisfactory overwrite of previous data stored within media, the saturation moment ($M_s$) of the write head pole tips must be greater than approximately 60 percent of the media $H_k$. Therefore, increases in $K_u$, to increase thermostability as the data bit size shrinks, in turn requires improvement in the write heads for the media. Thus high moment write pole materials are key areal density enablers in magnetic recording.

Enhancement of the magnetic moment of materials has been observed in nanoclustered magnetic materials. Magnetic nanoclusters have been used for the study of fundamental properties of magnetism, with a focus on general properties of isolated clusters. Potentially, the need in the art for high magnetic moment materials for inclusion in write pole structures may be fulfilled by development of nanoclustered thin film materials and associated techniques.

BRIEF SUMMARY OF THE INVENTION

The present invention includes magnetic write elements having a write pole that includes a nanophase high magnetic moment material to enable further increases in areal density in magnetic recording. Enhancement of the magnetic moment above that of the bulk material has been observed in magnetic nanoclusters. Nanophase write poles of the present invention utilize high volume fraction nanoclustered thin films to form high $M_s$ materials for write pole applications. The nanoclustered thin films used in the nanophase write poles may be formed from either coated nanoclusters or nanocluster laminates. The nanophase write poles may be used in longitudinal or perpendicular writers, and in both conventional and advanced inductive writer designs.

DETAILED DESCRIPTION

Figures 1A, 1B:
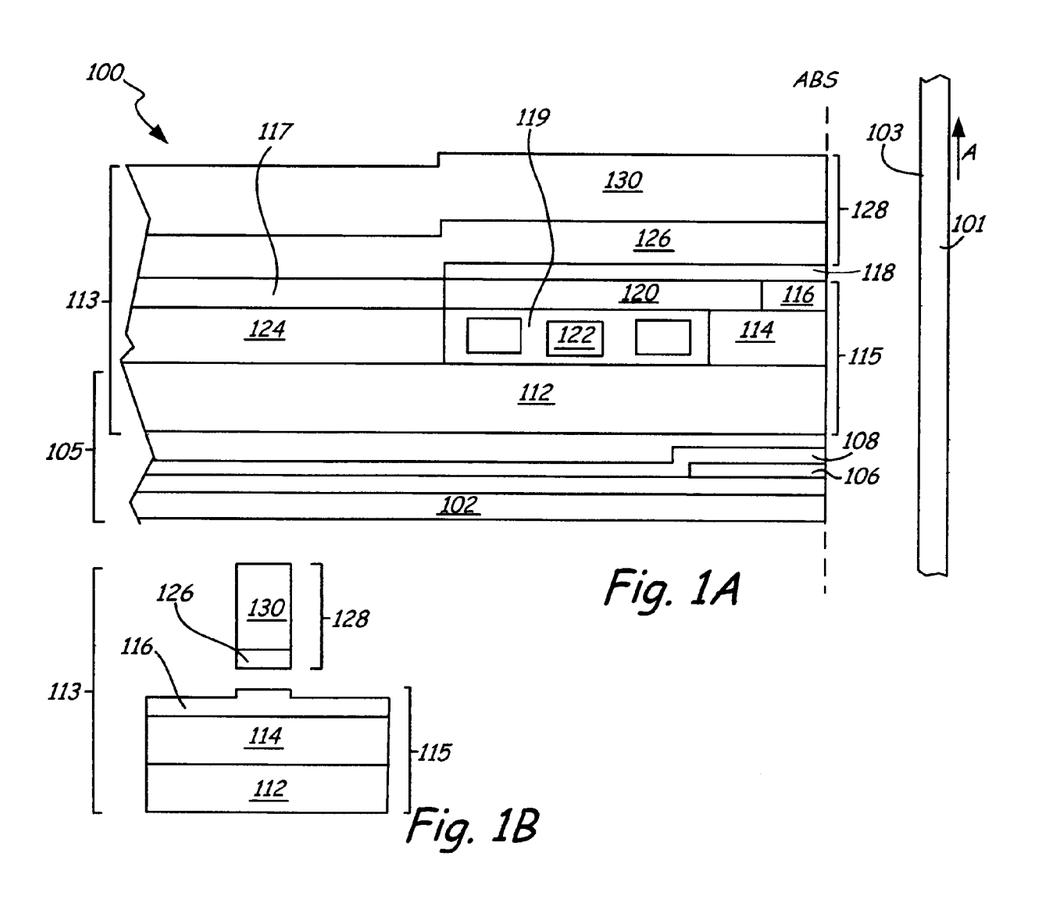
FIG. 1A is a cross-sectional view taken perpendicular to the air bearing surface of an example transducing head incorporating nanophase write poles.
FIG. 1B is a cross-sectional view taken in the plane of the air bearing surface of the writer portion of an example transducing head.

FIG. 1A is a cross-sectional view of a transducing head 100 incorporating nanophase write poles. Nanophase write poles include at least one thin film layer which incorporates nanoclustered materials (nanoclusters). The thin film incorporating nanoclusters is preferably a nanophase high magnetic moment material incorporating a high volume of nanoclusters with high magnetic moments held in a coating material and/or additional matrix layers. Two example thin films formed with nanophase materials are coated nanoclusters and nanocluster laminates. Thin layer high magnetic moment nanophase materials are used to replace conventional high moment materials in transducing heads, such as transducing head 100.

The cross-sectional view of FIG. 1A is taken along a plane normal to an air bearing surface (ABS) of transducing head 100. An ABS view of transducing head 100 (with spacers and insulating material omitted) is shown in FIG. 1B. The ABS of transducing head 100 faces disc surface 103 of magnetic disc 101, which travels or rotates in a direction relative to transducing head 100 as indicated by arrow A.

Transducing head 100 shown in FIG. 1A includes a reader portion 105 and a writer portion 113. The reader portion 105 generally comprises bottom shield 102, read element 106, metal contact layer 108, and top shield 112. Typically, read element 106 is a magnetoresistive (MR) sensor, positioned adjacent the ABS between bottom shield 102 and top shield 112 (or shared pole) in contact with metal contact layer 108.

The writer portion 113 and reader portion 105 of transducing head 100 are often arranged in a merged configuration, as shown in FIG. 1A, in which shared pole 112 functions as both a top shield for the reader portion 105 and as a bottom pole for the writer portion 113. The writer and reader portions of transducing head 100 may also be arranged in a piggyback configuration in which the top shield and bottom pole are two layers separated by a non-magnetic layer. Alternatively, the writer portion could be formed without the reader portion.

The writer portion 113 of transducing head 100 includes bottom pole 115, write gap layer 118, insulating layers 119 and 120, conductive coils 122, back via 124, and composite top pole 128. Bottom pole 115 includes shared pole 112, shared pole extension 114, and frosting layer 116. Composite top pole 128 includes a first top pole layer 126 and a second top pole layer 130. Composite top pole 128 and bottom pole 115 are separated from each other at the ABS of transducing head 100 by write gap layer 118, and are connected to each other at a region away from the ABS by back via 124 and a second portion 117 of the back via. Frosting layer 116, shared pole extension 114, shared pole 112 of bottom pole 115, back via 124, second portion 117, and first top pole layer 126 and second top pole layer 130 of composite top pole 128 form a path for conduction of magnetic flux, collectively called the magnetic core.

Electrically conductive coils 122 are held in place between composite top pole 128 and bottom pole 115 by write gap layer 118 and insulating layers 119 and 120. Electrically conductive coils 122 are provided to generate magnetic fields across the write gap. Conductive coils 122 are shown in FIG. 1A as one layer of coils, but may also be formed of more layers of coils as is known in the field of magnetic read/write head design.

To write data to a magnetic medium, such as magnetic disc 101, a time-varying electrical current, or write current, is caused to flow through conductive coils 122. The write current induces magnetic flux that is conducted within the core and focused at the write gap by the pole tips. The magnetic field bridges the write gap forming a write gap field. The magnetic disc is passed over the ABS of magnetic recording head 100 at a predetermined distance such that the magnetic surface 103 of disc 101 passes through the gap field. The write current changes causing the write gap field to alter in intensity and direction, thereby writing data to the media.

Increasing the strength of the write gap field for writing to higher areal density media generally requires the materials of the magnetic core to conduct relatively high flux densities. Magnetic materials have a magnetic saturation level ($M_s$) beyond which they will conduct no additional magnetic flux. Therefore, each material has an intrinsic limit to the flux density that can be conducted. Consequently, it is desirable to incorporate high magnetic moment materials because these materials conduct a larger quantity of magnetic flux before reaching the point of magnetic saturation. The ability to conduct relatively high flux densities is especially desirable at those portions of the magnetic core or poles, which are adjacent to the gap. Those portions, commonly called the pole tips, are critical for controlling the effective direction of the magnetic flux (write gap field) into the media.

The present invention applies nanoclustered materials to regions of the magnetic core where the inclusion of a high magnetic moment material is advantageous for writing to media with increased areal density. Nanoclustered materials have exhibited enhancement of the magnetic moment above that of the bulk material from which they are derived. Enhancement above the 2.45 $\mu_B$ maximum suggested by the Slater-Pauling curve is possible for some nanoclustered materials. The magnetic nanoclusters described in the present invention are applied in thin films including a high volume fraction of nanoclusters (nanoclustered thin films) to form high $M_s$ materials for write pole applications.

In the present invention, nanoclustered thin films are used to form nanophase write poles in writer designs incorporating high moment materials, for example writer portion 113 of transducing head 100. Write portion 113 of transducing head 100 produces a write gap field of sufficient strength to overwrite magnetic media of increased areal density by inclusion of high magnetic moment nanocluster materials. The high magnetic moment nanocluster materials may be included in either or both composite top pole 128 and bottom pole 115. More particularly, the high magnetic moment nanocluster materials are preferably included in either or both frosting layer 116 of bottom pole 115 and first top pole layer 126 of composite top pole 128. The frosting layer 116 and top pole seed layer 126 are each formed of nanoclustered thin films wherein the magnetic nanoclusters have high magnetic moments.

The nanoclustered thin films preferably have a magnetic saturation moment of 2.4 T or greater. Magnetic materials exhibiting high magnetic moments at room temperature have been demonstrated from the deposition of mass-selected magnetic nanoclusters containing a few hundred atoms. There are two general approaches described for application of magnetic nanoclusters to form high moment thin films: coated cluster deposition and nanolaminated cluster films.

Coated cluster deposition is the coating of magnetic nanoclusters in flight with either ferromagnetic or other metallic materials during deposition onto a substrate surface. The clusters are nanoscale, approximately 1–5 nm in size comprising approximately 4–5000 atoms each. An approximate size, which preferably varies within a limited range, is selected based on the desired properties of the coated nanoclusters. A suitable size for write head applications is selected from a range between approximately 200 to 800 atoms per cluster with variation of approximately ±10%. The magnetic nanoclusters may be formed of Fe, Mn, Co, Ni and alloys thereof and may further encompass other magnetic alloys including, for example, rare earth alloys. Additionally, the magnetic moments of the nanoclusters, particularly iron nanoclusters may be further enhanced by the adsorption of electron donating ligands including hydrogen or nitrogen. For example, the magnetic moment of hydrogen-saturated iron clusters is greater than that of corresponding bare iron clusters where the hydrogen-saturated iron clusters have atomic ratios of $Fe_nH_m$ when n=11–18 and m=1. Magnetic nanoclusters either with or without adsorbed material are further processed as follows.

The magnetic nanoclusters are mingled in flight with a coating material thereby resulting in deposition on a substrate as coated nanoclusters. The coating material will typically be a metal or metallic material, but may be any material compatible with high vacuum deposition techniques commonly used in writer fabrication. In thin films where a high magnetic moment is desired, it is preferable to maximize the volume of the magnetic material within the total volume of the thin film layer. This is achieved by depositing the nanoclusters in a manner to maximize the ratio of nanoclusters to coating material, thereby achieving a high volume fraction nanocluster thin film.

Additionally, it is preferred that the coating material further enhance the magnetic moment of the coated clusters. Ferromagnetic materials, such as Fe or Co or alloys thereof, further enhance the overall magnetic moment of the nanoclustered thin films when used as coating material. One suitable combination of nanoclusters and coating material for a nanophase high magnetic moment material is Fe clusters coated with Co. Paramagnetic materials or other materials in which a magnetic moment may be induced may also be used as coating materials, one example being Pd.

Materials that quench or dampen magnetic moments would not be desirable for use as coating material in high magnetic moment material applications. Where less magnetic material per unit volume is used in the thin film, the magnetic moment will be diluted. However, this may allow for the customization of the magnetic saturation properties that are desired for intermediate layers such as the shared poled extension 114 or the top pole layer 130 of previously described writer portion 113 of transducing head 100.

Figure 2:
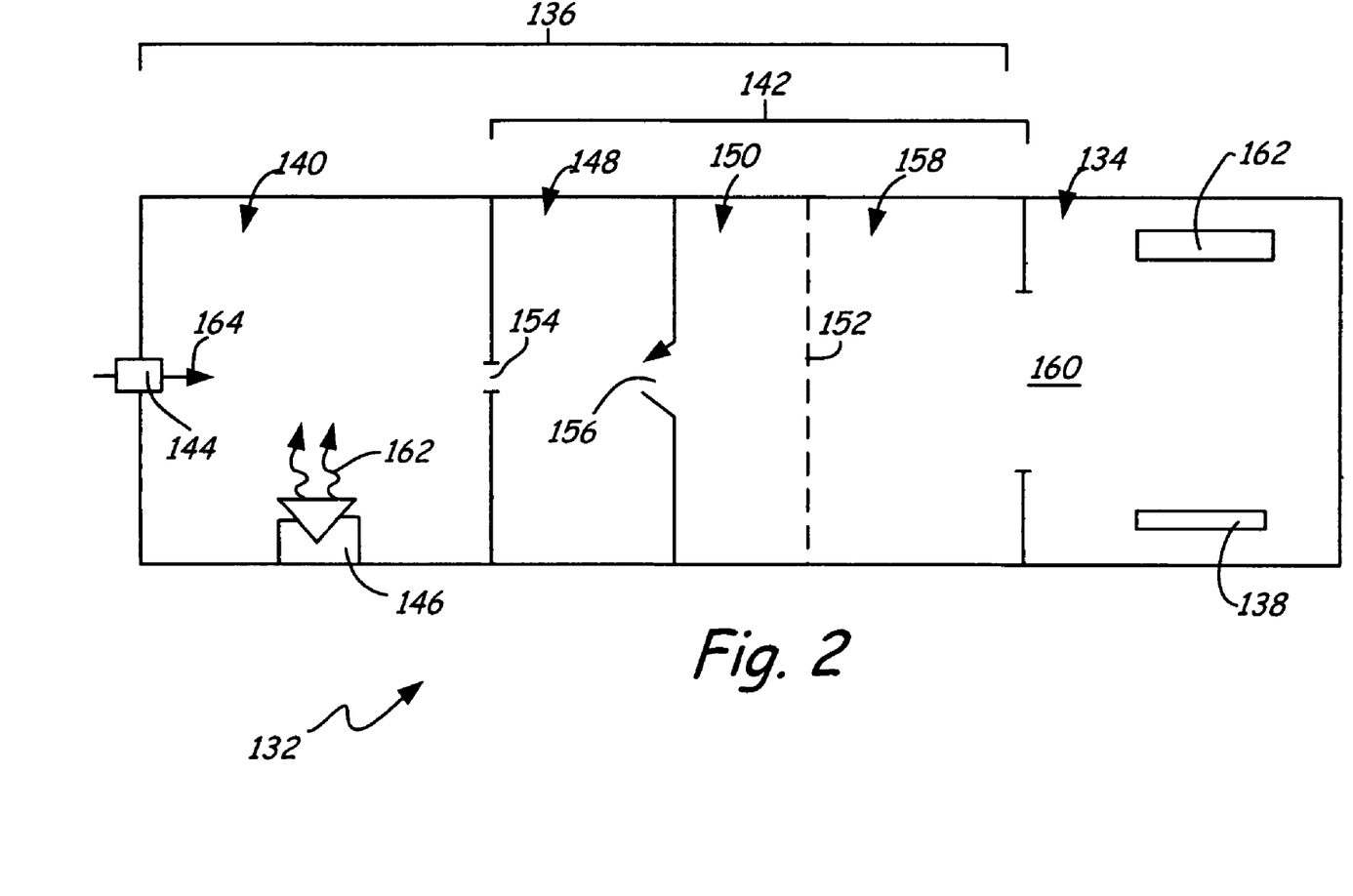
FIG. 2 is a schematic representation of a deposition system including a nanocluster source connected to a high vacuum deposition chamber.

Nanoclusters are formed and deposited using an apparatus such as deposition system 132 shown in a general schematic cross-section in FIG. 2. Deposition system 132 includes a main chamber 134 with an attached gas aggregation source 136. An example of a suitable gas aggregation source is described in Baker, S. H., Thornton, S. C., Edmonds, K. W., Maher, M. J., Norris, C. *The Construction of a Gas Aggregation Source for the Preparation of Size-selected Nanoscale Transition Metal Clusters, Review of Scientific Instruments*, Vol. 71, no. 8, (August 2000), pp. 3178–3183, herein incorporated by reference. The gas aggregation source 136 may be either an integrated unit or a series of interconnected modules. The main chamber 134 containing the substrate 138 is of a type known in the art for fabrication of transducing heads.

The gas aggregation source 136 may be divided into a gas aggregation region 140, and a filter assembly 142. The gas aggregation region 140 is attached to filter assembly 142, which is in turn attached to the main chamber 134. These chambers are generally connected with openings such that material may move from one chamber to another, but otherwise isolated in a fashion to allow differential pumping (not shown) for the maintenance of pressures suitable to the method or task performed in each chamber. For example, main chamber 134 is typically maintained at the high vacuum conditions suitable for material deposition onto a wafer, for example physical vapor deposition (PVD) processes. In comparison, the gas aggregation region 140 will operate at a somewhat higher pressure, typically 2–5 mbar.

The gas aggregation region 140 includes a gas control 144 and a crucible assembly 146. Filter assembly 142 generally comprises a first area generally referred to as a skimmer 148 followed by an ionizer 150 with a charging grid 152. The gas aggregation region 140 is separated from filter assembly 142 by a small aperture 154. The filter assembly 142 also includes a small aperture 156 separating skimmer 148, from ionizer 150 and mass selector 158. In one embodiment, deposition system 132 includes optional mass selector 158 as part of filter assembly 142. Alternatively, mass selector 158 may be omitted where size control of the nanoclusters is either unnecessary or is achieved by manipulation of the nanocluster formation process. An opening 160 leads from filter assembly 142 and gas aggregation source 136 into main chamber 134 for deposition onto substrate 138.

A layer of coated cluster nanophase material is generally formed by deposition system 132 in the following manner: a first metal material is heated in crucible 144 until it evaporates, thereby producing vaporized metal 162. A cooled inert gas (bath gas) 164, for example He, is streamed from gas control 144 through the gas aggregation region 140. Metal vapor 162 effuses into the bath gas 164. Thermalization with the bath gas results in a supersaturated metal vapor which nucleates and forms metal clusters. A portion of the metal clusters then flow, typically carried by the gas, through aperture 154 into skimmer 148 and through aperture 156 into ionizer 150. In ionizer 150, the metal clusters are charged by charging grid 152 and proceed through mass selector 158 such that nanoclusters of first metal material within a desired mass range proceed through opening 154 into main chamber 134. Where mass-selection is unimportant, a neutral rather than charged beam may be used to deposit the nanoclusters onto substrate 138.

Deposition system 132 is one portion of an overall fabrication process of transducing heads or writers on the wafer substrate 138. The clusters are preferably produced under clean, ultrahigh vacuum (UHV) conditions. The nanoclusters are delivered into the main chamber 134 where they are co-deposited with the particles from source 162, thereby forming a coated cluster film on substrate 138. Main chamber 134 is preferably maintained under clean, UHV conditions. Source 162 may be any source suitable for vacuum deposition, for example PVD processes including vacuum evaporation, molecular beam epitaxy (MBE) and ion beam sputter deposition.

It is preferred, but not required, to size select the nanoclusters during formation prior to deposition on a substrate. Substrate 138 is typically a wafer supporting several thousand transducing heads, such as transducing head 100. The magnetic properties of the nanoclusters vary with size. The enhancement of the magnetic moment is related to the surface area to volume ratio for the nanocluster. The enhancement of magnetic moment of the nanocluster decreases with increasing size. Size selection of the nanoclusters increases uniformity of the nanoclustered materials. Variability of size within a range of ±100 amu is suitable. The mass selected nanoclusters preferred for high magnetic moment write pole applications contain approximately a few hundred atoms, typically varying from approximately 200 to 800 atoms more preferably approximately 400 per nanocluster.

Coated cluster deposition results in a thin film comprising nanoclusters of a first material within a coating of a second material, also referred to as coated nanoclusters. The coated nanoclusters may be deposited directly on any portion or structure of substrate 138 or alternatively may be deposited on a high moment seedlayer thereby encapsulating the coated cluster film. Optionally, deposition of the coated nanoclusters may be followed by an additional high moment frosting layer for further encapsulation. Further encapsulation of the nanoclusters provides increased corrosion protection and mechanical stability.

Another type of thin film comprising nanoclusters is nanocluster laminate, which may also be called nano-laminated cluster film. A nano-laminated cluster film consists of laminations of layers (thin films) of coated nanoclusters alternated with a suitable co-deposited matrix material. For high moment write pole applications, the high moment nano-laminated cluster film will typically be between 5 nanometers and 30 nanometers thick and consist of approximately between 2 to 15 laminations of alternating layers of coated nanoclusters and matrix material. The co-deposited matrix material will preferably have a high magnetic moment where a high magnetic moment is desired in the overall nanocluster laminate. The matrix material is one that must be suited for deposition by vacuum deposition processes such as evaporation PVD, CVD, evaporation and IBD. The matrix material (third material) may be either the same or different from either the coating material (second material) or the nanocluster material (first material) used to form coated nanoclusters.

The process of alternating operation of nanocluster production with deposition from source 162 will result in nanocluster laminate material where the clusters are coated in the same material that forms the matrix layers. For example, interrupted operation of the gas aggregation source 136 while deposition is increased or otherwise continued from source 162, results in matrix layers of second material from source 162 alternating with layers of coated nanoclusters.

Where it is desirable that a third material is used as the laminate matrix material, (where the third material varies from the second material), a third source is simply introduced to form the laminate matrix layers. A source (not shown) of the third material may either be included in main chamber 134, or the substrate 138 is moved from main chamber 134 into another chamber for deposition from the source of the third material. In either case, the result is periodically interrupted depositions of the high moment nanoclusters with a suitable, preferably high moment, vacuum-deposited thin film matrix layer, resulting in a nano-laminated cluster film. Optionally, the nanocluster laminate may both begin and end with matrix deposition to encapsulate the nanocluster laminate.

Figure 3:
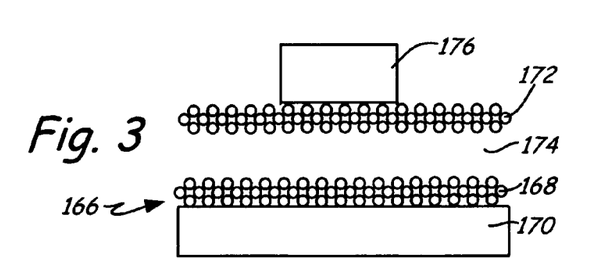
FIG. 3 is a cross-sectional view taken in an ABS direction of a portion of an example longitudinal write head prior to write pole definition during fabrication.
Figure 4:
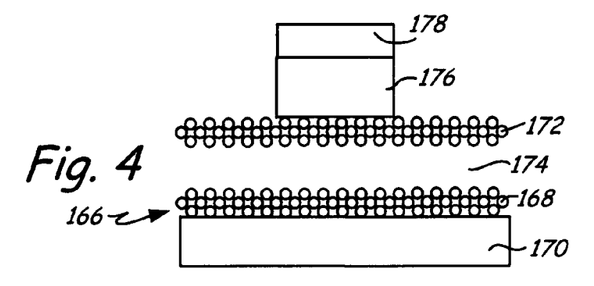
FIG. 4 is a cross-section view taken in an ABS direction of a portion of a longitudinal write head showing placement of a mask prior to definition of the write poles.
Figure 5:
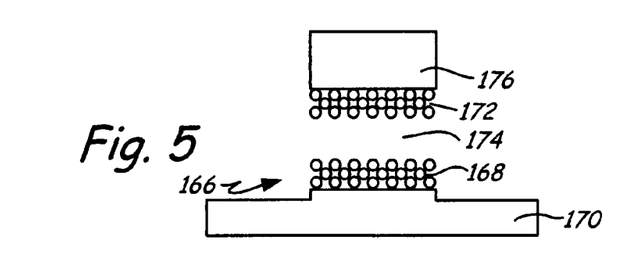
FIG. 5 is a cross-sectional view taken in an ABS direction following definition of the write poles and stripping of the mask during fabrication of a longitudinal write head.
Figure 6:
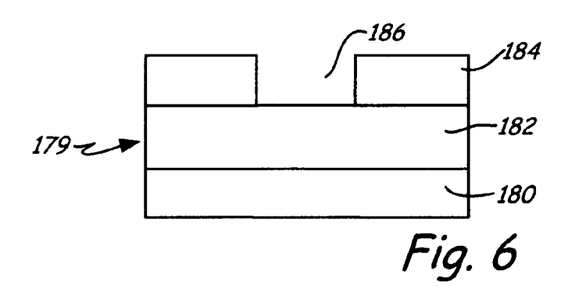
FIG. 6 is a cross-sectional view taken in an ABS direction of an example perpendicular write head during fabrication showing placement of the mask prior to definition for write pole placement.
Figure 7:
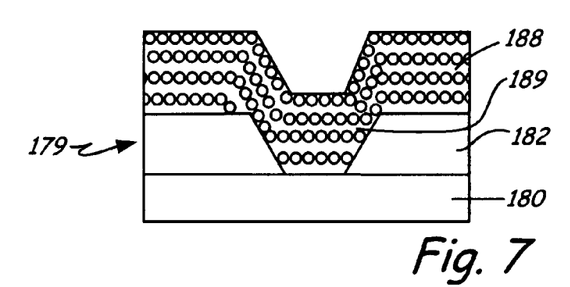
FIG. 7 is a cross-sectional view taken along the ABS during fabrication of a perpendicular write head after deposition of a high moment coated cluster nanolaminate film.
Figure 8:
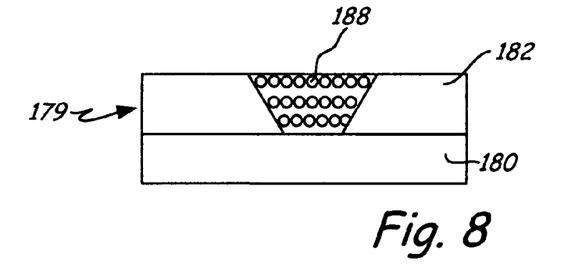
FIG. 8 is a cross-sectional view taken along the ABS following planarization of the nanocluster laminate film thereby defining the top pole length.

The integration of coated cluster deposition and nanocluster laminate into fabrication processes for writers is further described below. FIGS. 3–5 illustrate fabrication of an example writer including thin films of nanoclusters, while FIGS. 6–8 illustrate the application of nanolaminated cluster films to an example perpendicular writer. The use of thin films comprising coated nanocluster deposition and nanocluster laminates is not limited to the example writer configurations illustrated herein. Additionally, coated cluster deposition and nanocluster laminates are not limited to either longitudinal or perpendicular writers, but may be freely interchanged and potentially used in combination in a writer design.

FIG. 3 shows a partially completed writer 166 with a high moment coated nanocluster film forming a high magnetic moment layer 168 on a shared pole or shield 170, and additionally forming a second high magnetic moment layer 172 directly above the write gap 174. A top pole 176 is plated onto second layer 172. A seedlayer (not shown) may be deposited upon second layer 172 prior to plating top pole 176. The example writer 166, shown from the ABS in FIG. 3, is a longitudinal writer design, but the patterning method and use of high moment coated cluster film is equally feasible in other writer designs.

Coated cluster deposition and formation of nanocluster laminate thin films are compatible with conventional fabrication processes used in write pole formation. The nanophase portions of example writer 166 of FIG. 3 may be formed using physical patterning processes known in the art of write head fabrication. The partially completed writer 166 of FIG. 3 is one of several thousand similar writers positioned on a common wafer for fabrication. The shared pole (or shield) 170 is commonly deposited over the read head portion of a transducing head, with the read head portion positioned adjacent to a wafer support (not shown). After shared pole 170 is deposited, a first layer of a thin film is formed containing magnetic nanoclusters exhibiting high magnetic moments. One suitable example is the coated cluster deposition process described above. During deposition, the size of the nanoclusters, the deposition matrix and the volume fraction of nanoclusters to coating material is controlled to create a nanocluster thin film with the desired magnetic properties ($M_s$). Subsequently, the write gap 174 is deposited followed by a second layer of high magnetic moment nanoclusters, thereby forming a second nanocluster thin film 172. A resist is applied upon the nanocluster thin film 172 to define the area for subsequent plating of top pole 176.

FIG. 4 shows the location of photoresist 178 or other mask, which is used to define the size and shape of the writer. After top pole 176 is protected with photoresist; conventional physical or chemical etching techniques, for example: reactive ion etching (RIE), ion milling or wet etch methods are applied causing the removal of material not protected by the photoresist. The etching is typically continued until the shared pole is reached, followed by removal of the photoresist. The resulting structure is shown in FIG. 5, which shows top pole 176 with defined width and length dimensions, thereby forming a write pole of appropriate geometry.

A nano-laminated cluster film is incorporated into a perpendicular writer design using fabrication methods demonstrated in FIGS. 6–8. The partially completed perpendicular writer 179 is shown in FIG. 6 where a yoke 180 is covered by a layer of dielectric 182, which will be used to define the top pole shape. A mask material, for example photoresist 184, is applied and developed such that an opening 186 corresponding to the width of the top pole is created in photoresist 184.

The nano-laminate write pole of perpendicular writer 179 is formed by first patterning a suitable resist or hard mask using either a photo or E-bean lithography and then using conventional physical or chemical etching techniques, such as RIE, ion milling or wet etch methods to form a trench in the dielectric material of the appropriate dimensions for the particular writer design. After stripping the resist 184 or hard mask, a high moment laminate cluster film 188 is deposited by the methods as described above, thereby filling the trench 189 in the dielectric as shown in FIG. 7.

Top pole 188 is completed by subsequent planarization of the laminate film to the desired top pole length. After the nanocluster thin film 188 has formed, it is planarized to the appropriate dimensions by some form of chemical, mechanical or vacuum processing or a combination thereof. Physical patterning processes or photo liftoff approaches are equally feasible where further definition of the top pole width or further removal of nanocluster laminate material remaining on the dielectric is needed, thereby resulting in the defined top pole 188 shown in FIG. 8. Alternatively, nanocluster thin film may be used to form a portion, for example a frosting layer (not shown), of top pole 188.

Nanoclustered materials may also be used in regions of the magnetic core that are not necessarily part of the writer head. For example, in FIG. 9, a cross-sectional diagram of perpendicular writer 190 relative to perpendicular media 192 is shown. Perpendicular writer 190 includes a main write pole 194, a via 196, a return pole 198 and a coil 200. The perpendicular media 192 includes a magnetic recording layer 202 and a soft under layer 204.

Perpendicular writers generally operate by flowing current through coil 200, thereby generating magnetic flux which flows through the region in the writer generally called the magnetic core. The flow of magnetic flux is illustrated by dashed line 206 in FIG. 9. The magnetic flux flows through main write pole 194 into magnetic recording layer 202 creating stored signal 208. The flux passes through the soft under layer (SUL) 204 of the perpendicular media 192 and into return pole 198 thereby completing a magnetic circuit required for operation of the writer.

Figure 9:
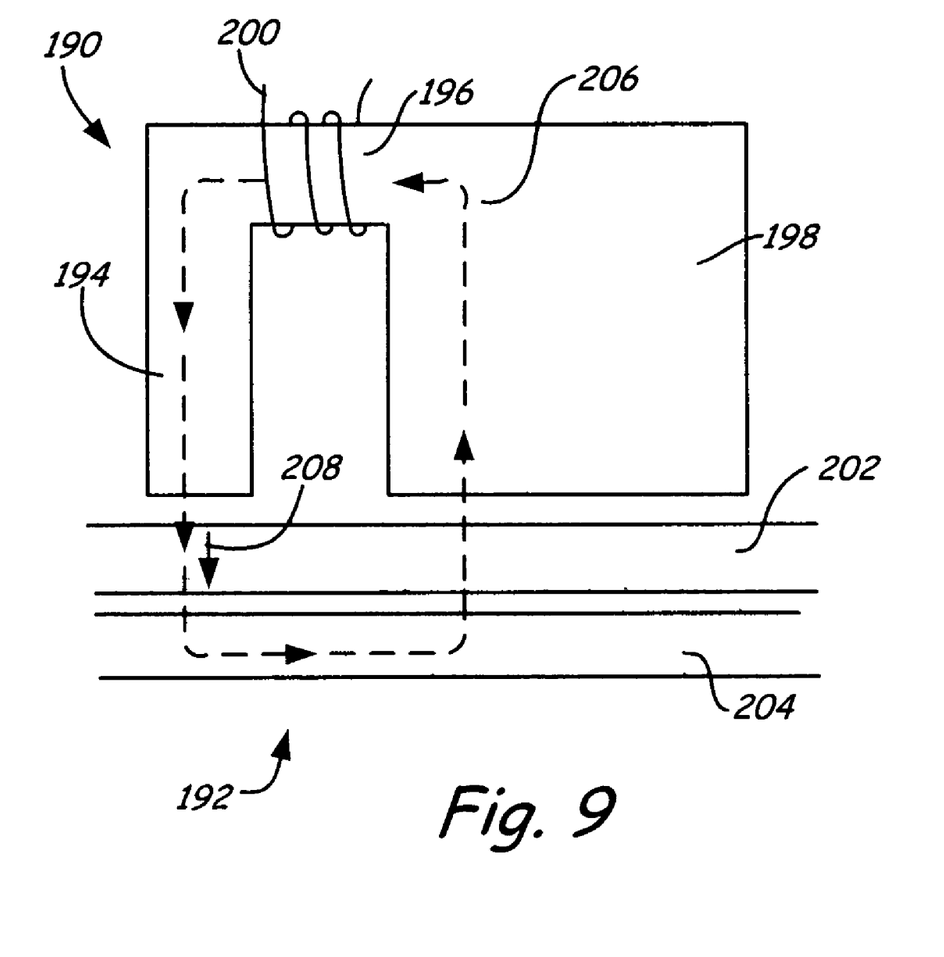
FIG. 9 is a cross-sectional view taken perpendicular to the air bearing surface of a perpendicular write head adjacent to magnetic recording media.

In addition to placing nanoclustered materials as demonstrated in the previous examples, nanoclustered materials may also be included in the SUL layer of perpendicular media. In the operation of perpendicular writer, SUL 204 of media 192 itself acts with writer 190 to complete the magnetic circuit and therefore may be considered a necessary part of the writer. Nanophase write poles are applied in a variety of magnetic write element applications including transducing heads and the inclusion of nanoclustered materials in the SUL layer of perpendicular recording media.

Thin films comprising coated nanoclusters and/or nanocluster laminates to form high moment write pole applications are not limited to the specific writer designs demonstrated herein. Many different writer designs incorporate high magnetic moment materials. The novel application of high magnetic moment films composed of nanocluster deposited magnetic materials with a magnetic or nonmagnetic coating or, laminated films consisting of alternating nanocluster layers and suitable magnetic or nonmagnetic films can be applied in any write pole design where high magnetic moment films are desired. Nanophase thin films may be used in a variety of thin film structures due to their compatibility with conventional patterning and fabrication methodologies. Damascene and photo lift-off patterning approaches may be used with either coated cluster write pole formation or nanocluster laminate write pole formation. Nanophase thin films may be used in any type of transducing head, including longitudinal or perpendicular writer designs, and advanced inductive designs including derivatives, such as thermal or field assisted writers.

Although the present invention has been described with reference to preferred embodiments, workers skilled in the art will recognize that changes may be made in form and detail without departing from the spirit and scope of the invention.

The invention claimed is:

1. A magnetic element comprising at least one layer of a nanophase magnetic material incorporating nanoclusters of a first magnetic material containing approximately 200 to 800 atoms per nanocluster surrounded by a second magnetic material, the nanoclusters having a size of about 1 nanometer to about 5 nanometers, and the layer of nanophase magnetic material having a magnetic saturation moment of greater than 2.4 T.

2. The magnetic element of claim 1 wherein the first magnetic material is selected from the group consisting of: Fe, Mn, Co, Ni and alloys thereof.

3. The magnetic element of claim 2 wherein the nanoclusters are coated in flight with second magnetic material selected from the group consisting of: Fe, Mn, Ni, Co and alloys thereof.

4. The magnetic element of claim 2 wherein the nanoclusters are adsorbed with an electron-donating material selected from the group consisting of: hydrogen and nitrogen.

5. The magnetic element of claim 1 wherein the nanophase magnetic material comprises a nano-laminated cluster film having a thickness of about 5 nanometers to about 30 nanometers.

6. The magnetic element of claim 5 wherein the nano-laminated cluster film comprises:
   at least one layer of nanoclusters of the first magnetic material with magnetic saturation moments greater than 2.4 T; and
   a plurality of magnetic matrix layers wherein the nanocluster layers are approximately alternating with the matrix layers.

7. The magnetic element of claim 6 wherein the first magnetic material is selected from the group consisting of: Fe, Mn, Ni, Co and alloys thereof.

8. The magnetic element of claim 6 wherein the matrix is a vacuum-deposited magnetic material.

9. The magnetic element of claim 6 wherein the matrix is formed of a material selected from the group consisting of: Co, Fe and alloys thereof.

10. The magnetic element of claim 6 wherein the number of nanocluster layers and matrix layers is approximately between 2 and 15.

11. The magnetic write element of claim 1 wherein the nanophase magnetic material forms part of a write pole.

12. The magnetic element of claim 1 wherein the nanophase magnetic material forms an SUL layer of perpendicular recording media.

13. A magnetic write element having a write gap, the element comprising:
   a bottom pole;
   a first magnetic layer located upon the bottom pole at the write gap, wherein the first magnetic layer includes nanophase magnetic material incorporating nanoclusters of a first magnetic material containing approximately 200 to 800 atoms per nanocluster surrounded by a second magnetic material, the nanoclusters having a size of about 1 nanometer to about 5 nanometers, and the first magnetic layer having a magnetic saturation moment of greater than 2.4 T; and
   a second magnetic layer adjacent to the write gap opposite to the first magnetic layer, wherein the second magnetic layer includes nanophase magnetic material incorporating nanoclusters of a first magnetic material containing approximately 200 to 800 atoms per nanocluster surrounded by a second magnetic material, the nanoclusters having a size of about 1 nanometer to about 5 nanometers, and the second magnetic layer having a magnetic saturation moment of greater than 2.4 T, and
   a third magnetic layer plated upon the second magnetic layer thereby forming a top pole.

14. The magnetic write element of claim 13 wherein the nanophase magnetic material comprises coated magnetic nanoclusters.

15. The magnetic write element of claim 14 wherein the coated magnetic nanoclusters comprise nanoclusters of magnetic materials selected from the group consisting of: Fe, Mn, Co, Ni and alloys thereof.

16. The magnetic write element of claim 15 wherein the nanoclusters are coated in flight with a magnetic material selected from the group consisting of: Fe, Mn, Ni, Co and alloys thereof.

17. The magnetic write element of claim 15 wherein the nanoclusters are adsorbed with an electron-donating material selected from the group consisting of: hydrogen and nitrogen.

18. The magnetic write element of claim 13 wherein the nanophase magnetic materials comprises nano-laminated cluster film having a thickness of about 5 nanometers to about 30 nanometers.

19. The magnetic write element of claim 18 wherein the nano-laminated cluster film comprises:
   at least one layer of nanoclusters of first magnetic material with magnetic saturation moments greater than 2.4 T; and
   a plurality of magnetic matrix layers wherein the nanocluster layers are approximately alternating with the matrix layers.

20. The magnetic write element of claim 19 wherein the first magnetic material is selected from the group consisting of: Fe, Mn, Ni, Co and alloys thereof.

21. The magnetic write element of claim 19 wherein the matrix is a vacuum-deposited magnetic moment enhancing material.

22. The magnetic write element of claim 19 wherein the matrix is formed of a material selected from the group consisting of: Co, Fe and alloys thereof.

* * * * *